Nov. 5, 1940.    E. L. SCHOLL ET AL    2,220,460
BONDING OF RUBBER TO METAL
Filed Jan. 12, 1938
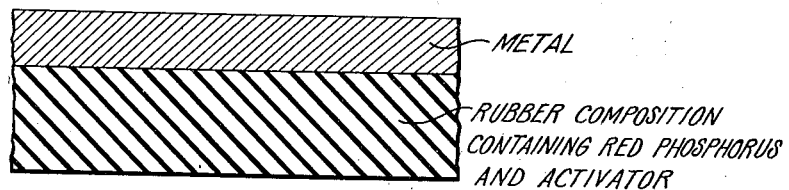
INVENTORS
ELLWOOD L. SCHOLL
AMOS W. OAKLEAF
JOHN D. MORRON
BY Gourley + Budlong
ATTORNEYS Patented Nov. 5, 1940

2,220,460

UNITED STATES PATENT OFFICE 2,220,460

BONDING OF RUBBER TO METAL

Elwood L. Scholl, Amos W. Oakleaf, and John D. Morron, Detroit, Mich., assignors, by mesne assignments, to United States Rubber Company, New York, N. Y., a corporation of New Jersey Application January 12, 1938, Serial No. 184,564

4 Claims. (Cl. 154—2)

This invention relates to a method of bonding rubber to metal, and in particular it relates to treatment of a rubber composition whereby to render it capable of being bonded directly to a ferrous metal with vulcanization of the rubber. In general, the invention contemplates the formation of a bond between rubber and a ferrous metal comprising the steps of mixing red phosphorous and an activating agent therefor with a vulcanizable rubber composition, applying the resultant composition to a metal having a ferrous base, and applying heat to the rubber to effect its vulcanization. The general assembly is shown in the accompanying drawing.

In the industry it has been general practice to bond rubber to a ferrous metal by first coating or plating the metal with a brass or bronze alloy. While in general this method has been satisfactory, it has many disadvantages. For example, in production methods of bonding rubber to metal considerable expense is involved in the installation and maintenance of tanks and equipment for pickling, plating, and washing metal parts. Furthermore, production methods are not suitable for plating metal where the parts are of various shapes and sizes.

In accordance with the practice of our invention, it is necessary only that the metal be relatively free from grease or other impurities. It is, therefore, an object of our invention to provide an economical and efficient method of bonding rubber to metals generally. Another object is to provide a method allowing the use of ultra and semi-ultra organic accelerators generally; heretofore good results have not been obtained when such accelerators are used with conventional methods of bonding rubber to metal. Another object is to provide a method of bonding rubber to a ferrous metal by the direct application of rubber to the metal. A still further object is to accomplish the foregoing objects while maintaining a degree of adhesion between the rubber and metal which is at least equal to the degree of adhesion ordinarily obtained between rubber and bronze or brass plated ferrous metal.

In a preferred embodiment of our invention a small proportion of red phosphorous and a halogen activating agent is mixed directly with a vulcanizable solid rubber composition containing besides sulphur, metallic oxide, carbon black, softener, antioxidant, an organic accelerator (preferably a semi-ultra or ultra-accelerator) and about 10% of a neutralizer such as lime or equivalent.

The following, in which the parts are by weight, is an example resulting in a high degree of adhesion when vulcanized directly to a ferrous metal:

| | |
|---|---|
| Rubber (smoked sheet) | 100 |
| Sulphur | 3 |
| Zinc oxide | 3 |
| Carbon black | 45 |
| Calcium hydroxide | 10 |
| Red phosphorous | 2 |
| Rubber chloride | 5 |
| Softener | 1 |
| Antioxidant | 1 |
| Mercaptobenzothiazole (accelerator) | 1 |

In mixing a composition of this kind we find it preferable to prepare the rubber composition on the mill in the usual manner, and to add the red phosphorous in the last step of the mixing operation. ½ to 5% of red phosphorous and 3 to 5% of the halogen compound, based on the rubber, have been found to give good adhesion.

A wide variety of halogen compounds are suitable as activators including $NaCl$, $KCl$, $NH_4Cl$, $KI$, $BaCl_2$, $KBr$, $NH_2OH.HCl$, $C_6H_5Br$, $CH_2Cl.CH_2Cl$, $HCl$, etc.

Adhesion has been obtained after adding the red phosphorus directly to the rubber, by the application of heat, but the assembled product is preferably subjected to pressure and heat sufficient to vulcanize the rubber as desired.

It is to be understood that other ultra or semi-ultra accelerators may be used including other thiazoles, than that in the example, such as dithiocarbamates, thiuram sulphides, etc.

In preparing ferrous metal for the application of the rubber composition it is merely necessary that the metal be free from grease or other impurities. An example of a commercial method of cleaning metal prior to the application of rubber is the conventional pickling process.

The red phosphorous may be mixed with the entire volume of the rubber to be applied to the metal or it may be contained in a thin sheet or layer of the rubber composition and this sheet applied either to the rubber surface or to the metal surface as an interfacial layer. In such case, the interfacial layer provides a medium having a high degree of adhesion property with both the metal and the rubber.

By using red phosphorous in a rubber composition as hereinbefore described, and applying the composition directly to a metal having a ferrous base, we find that the degree of adhesion between rubber and metal is on the order of a tensile pull at the separation point of 500 pounds and higher per square inch.

The term rubber is to be construed broadly as including caoutchouc, balata, gutta percha, and similar materials including synthetic or artificial rubber-like materials, e. g. polychloroprene (Neoprene) which are capable of being cured to an elastic state after incorporation of suitable vulcanizing ingredients.

Having thus described our invention, what we claim and desire to protect by Letters Patent is:

1. A method of bonding rubber to ferrous metal which comprises incorporating red phosphorous and a halogen-containing activator therefor into a vulcanizable rubber composition, applying said rubber composition directly to the metal, and uniting the rubber to the metal by the application of heat sufficient to at least partially vulcanize the rubber.

2. A method of bonding rubber to ferrous metal which comprises incorporating red phosphorous and a halogen compound into a vulcanizable rubber composition, applying said rubber composition directly to the metal, and uniting the rubber to the metal by the application of heat sufficient to at least partially vulcanize the rubber.

3. A method of bonding rubber to ferrous metal which comprises incorporating red phosphorous and a halogen-containing activator therefor into a vulcanizable rubber composition, applying said vulcanizable rubber composition as an interfacial layer between the metal and another vulcanizable rubber composition, and uniting the entire rubber mass together and to the metal by the application of heat sufficient to at least partially vulcanize the rubber.

4. A vulcanized rubber-to-ferrous metal assembly in which the rubber is bonded to the metal by means of red phosphorous and a halogen-containing activator incorporated with the rubber prior to cure.

ELWOOD L. SCHOLL.
AMOS W. OAKLEAF.
JOHN D. MORRON.